United States Patent [19]

Conard

[11] 3,980,610

[45] Sept. 14, 1976

[54] UNSATURATED POLYESTER-1,2 POLYBUTADIENE MOLDING COMPOUND

[75] Inventor: Wendell R. Conard, Kent, Ohio

[73] Assignee: The Firestone Tire & Rubber Company, Akron, Ohio

[22] Filed: Nov. 25, 1974

[21] Appl. No.: 526,548

[52] U.S. Cl. .............................. 260/40 R; 260/862; 260/873
[51] Int. Cl.² ..................... C08K 7/26; C08L 67/06
[58] Field of Search ............ 260/862, 861, 873, 40 R

[56] References Cited
UNITED STATES PATENTS

| | | |
|---|---|---|
| 3,217,066 | 11/1965 | Greenspan et al. ................ 260/862 |
| 3,577,478 | 5/1971 | Thorpe ............................... 260/862 |
| 3,733,370 | 5/1973 | Thompson et al. ................. 260/862 |
| 3,793,400 | 2/1974 | Curtis et al. ....................... 260/862 |
| 3,838,096 | 9/1974 | Nagasawa et al. ................. 260/862 |
| 3,855,194 | 12/1974 | Conard .............................. 260/880 |

*Primary Examiner*—Murray Tillman
*Assistant Examiner*—Thurman K. Page

[57] ABSTRACT

This invention relates to the use of a resinous polybutadiene or butadiene-styrene copolymer of high 1,2-configuration in polyesters of unsaturated acids which may contain styrene or the like, to raise the heat distortion temperature of the polyesters and increase their resistance to hydrocarbon solvents and sodium hydroxide solution.

8 Claims, No Drawings

UNSATURATED POLYESTER-1,2 POLYBUTADIENE MOLDING COMPOUND

THE PRIOR ART

There is art on the addition of polybutadienes to polyesters of unsaturated acids. U.S. Pat. No. 3,793,400 describes adding polybutadiene with a molecular weight of over 100,000 and a high 1,2-configuration to polyesters to increase their impact strength or if low molecular weight polybutadiene is used, high molecular weight 1,4-polybutadiene is mixed with it.

BACKGROUND OF THE INVENTION

A resinous polymer of butadiene homopolymer or butadiene-styrene copolymer has been introduced to the market as Dienite. It has a butadiene content of 60 per cent or more by weight, and at least 80% by weight of the butadiene therein is of the 1,2-configuration. Dienite is added to polyesters of unsaturated aliphatic acids to increase their heat distortion temperatures and resistance to hydrocarbon solvents and aqueous sodium hydroxide. The flow and handling of such blends is improved by including styrene.

SUMMARY OF THE INVENTION

The invention relates to the curing of a polyester and the recently developed Dienite class of polybutadiene and butadiene-styrene copolymer resins. The blend advantageously contains styrene also for many uses.

The polyester to which this specification refers is essentially an ester of a dihydroxy alcohol (namely, ethylene, propylene, diethylene or dipropylene) and an unsaturated acid or acid anhydride such as fumaric or maleic acid or anhydride, or a mixture of such alcohols and acids or anhydrides. These are used in the art for the reinforcement of glass and other plastic articles. A small amount of glycerine may be added with the alcohol to make the ester trifunctional. Styrene or other vinyl monomer has been used to improve their flow and handling.

The average molecular weight of the polybutadiene homopolymer or copolymer resin (determined by intrinsic viscosity measurement) is at least 12,500 and the molecular weight distribution is such that at least 50 per cent, and preferably 90 per cent, of the polymer has a molecular weight above 10,000 and at least 95 per cent has a molecular weight above 2,000. It has been found that the presence of higher proportions of lower molecular weight polymers than allowed by these limitations causes slow curing rates and poor physical properties in the cured product. For good solubility, good processibility and good flow during the molding the average molecular weight should be no greater than 85,000. This corresponds to a dilute solution viscosity of about 0.9 taken at 30°C. The Dienite resin should also have a dilute solution viscosity of 0.2 – 0.9, preferably 0.3 – 0.9, and the following examples include runs of resin with such dilute solution viscosities. The addition of the Dienite improves the heat distortion properties of the polyester. The Dienite copolymer resin which contains 30 to 40 weight per cent of styrene is generally preferred for plastic reinforcement.

By adding 5 to 50 parts and preferably 15 to 40 parts of Dienite to 85 to 60 parts of the polyester in solution, which usually contains styrene, the heat-distortion point is raised and the solubility resistance of the cured blend in sodium hydroxide and hydrocarbon solvents is improved, as well as generally improving its physical properties. Although styrene may be used, vinyl toluene may generally be preferred because of its higher boiling point. Other hydrocarbon vinyl monomers which may be used include vinyl xylene, the vinyl naphthalenes, t-butylstyrene, etc.

When 5 to 50 parts of the Dienite are blended into 95 to 50 parts of a polyester, and preferably 15 to 40 parts of Dienite blended into 85 to 60 parts of a polyester, which may contain styrene or the like, and then the blend is cured with an organic peroxide in the presence of a vinyl monomer, valuable molded products are obtained. Where fast cures are desired, it is necessary to use a filler to avoid crazing, cracking or excessive shrinking. Fillers, such as silica, calcium silicates, calcium carbonate, asbestos, clay, powdered glass, alumina, etc. are advantageously added to the resin in the amount of 25-65, and preferably 40-60 volume per cent based on the combined resin-filler composition.

The resins may have incorporated in them glass fiber, either as chopped filler or else as glass fabric, in which case the glass fiber will serve the purpose of a filler in preventing crazing and cracking on fast cures. When compounded with up to 50–75% or more of filler, the composition is adapted for various molding operations, namely injection molding, extrusion, transfer molding and compression molding. The products are useful as electrical insulation, in automotive applications, for chemical storage tanks, and for various mechanical articles requiring higher temperature resistance up to 200°C.

Calcium stearate or other lubricant is generally used in the compositions to improve its adaptability to molding.

The Dienite resins are usually prepared by polymerizing or copolymerizing the monomers by means of free radicals or anionic catalysts to a molecular weight of say 10,000 – 25,000, so that they are of at least a flowable consistency. The low molecular weight polymers or copolymers are incorporated in the polyester with vinyl monomer and any desired fillers, reinforcing fibers or fabrics, pigments, etc., a curing agent and the composition is cured under heat and pressure to produce the desired finished article.

The Dienite resin, polyester and vinyl monomer are cured together. During curing, the resin and the polyester cross link and this produces a firmer blend than if the resin is cured before blending with the polyester. Cross-linking also occurs during cure, with the vinyl monomer, the polyester and the Dienite.

The blend of polyester, Dienite and vinyl monomer may be cured with any curing agent, a peroxide being preferred. For a peroxide cure, one may add approximately 0.5 – 6.0 parts of the peroxide per 100 parts of the resin blend, and preferably 1.5 – 3.0 parts, by weight, of dicumyl peroxide (or an equivalent weight of any other peroxide, preferably one giving radicals of the structure $R_2(CH_3)CO$. in which R independently in each occurrence represents a hydrocarbon radical of 1 - 20 carbon atoms, including Vulcap, Lupersol 130, benzoyl peroxide, etc.) and heating the blend, usually under pressure. The temperature for such curing is advantageously at least 250°F. (121°C.), preferably about 300° – 350°F. (149° – 177°C.). Generally, no advantage in the process or product is obtained by exceeding a temperature of 420°F. (216°C.). Obviously, the higher the temperature the shorter will be the curing time required. Generally at 350°F. (177°C.) a satisfactory cure is obtained in less than four minutes, and in some cases even within a few seconds. Curing times of more than four minutes may be desirable in the event that any halogen or metal compound which retards the cure rate is present in the blend; in these cases cure times of up to fifteen minutes generally give acceptable results.

Fillers may be used in the amounts of 10 to 200 parts or more by weight per 100 parts by weight of a blend of polyester, Dienite and vinyl monomer. Some blends which contain over 100 parts of filler tend to crack. It may be desirable to include for every part of filler of a silicone derivative (for instance, glass, silicate, asbestos, clay, etc.) 0.5 to 2 parts of an agent for bonding the filler to the plastic, such as an unsaturated group-containing silane, such as vinyl triacetoxysilane, vinyl tributoxy silane, vinyl trimethoxysilane, vinyl triethoxysilane, and/or a methacrylate functional silane. Such silanes may be used to assist in bonding siliceous filler to the plastic.

The blend compositions of this invention comprise 50 to 95 parts of polyester, 5 to 50 parts of Dienite with a molecular weight of 10,000 to 85,000 and 0 to 50 parts of vinyl monomer. A preferred blend includes 85 to 60 parts of polyester, 15 to 40 parts of a Dienite and 20 to 40 parts of an aromatic vinyl monomer.

The polyester compositions usually with a filler content of not over 200 parts per hundred, form plastics for extrusion and injection and compression molding. The blends have better high-temperature properties than polyester alone, being stable at temperatures up to 125°C. or better.

It has been found that by preparing the blend of this invention, and curing, as with a peroxide curing agent, a composition is obtained which when processed and cured is useful at higher temperatures than cured polyester alone.

The Dienite has an additional benefit where rapid gellation is desired in room temperature gelling or curing of polyesters containing cobalt accelerators. The Dienite at a 15% level, cuts the gel time in half and would be desirable where a rapid "lay up" is used.

The invention is further explained in connection with the following experimental data.

TABLE I

PPG POLYESTER/DIENITE ALLOYS

|  | Control | Run A | Run B | Run C |
|---|---|---|---|---|
| Polyester | 100 | 100 | 77 | 85 |
| DIENITE Copolymer |  |  | 15 |  |
| 0.2 DSV DIENITE Homopolymer |  |  |  | 15 |
| Vinyl toluene |  |  | 8 |  |
| Benzoyl Peroxide | 2 | 4 | 2 | 2 |
| Dicup R |  |  | 3 | 3 |
| Z-6075 Silane |  | 1 |  |  |
| Wollastonite | 200 | 200 | 200 | 200 |
| Cure Min. | 15 | 15 | 10 | 10 |
| °F. | 250 | 250 | 250 | 250 |
| + Min. |  |  | 10 | 10 |
| °F. |  |  | 350 | 350 |
| Rockwell E | 48 | 65 | 65 | 60 |
| Heat Distortion, °C. 264 psi | 68 | 65 | 88 | 88 |
| Wt. increase in MEK 17 days | 2.5% | 1.5% | 0.8% | 0.3% |
| Wt. increase 25% NaOH | 14.8% | 14.3% | 5.9% | 8.9% |

Table I shows that the Dienite increases the heat distortion properties of polyesters. The resistance to methyl ethyl ketone solvent and 25% sodium hydroxide was also increased appreciably.

TABLE II

HIGHER DIENITE COPOLYMER LEVELS IN POLYESTER

|  | Controls | | Run D | Run E |
|---|---|---|---|---|
| Polyester | 100 | 100 | 62 | 62 |
| DIENITE Copolymer |  |  | 25 | 25 |
| Vinyl Toluene |  |  | 13 | 13 |
| Benzoyl Peroxide | 2 | 2 | 2 | 2 |
| Dicup R | 2 | 2 | 2 | 2 |
| Wollastonite | 100 | 200 | 100 | 200 |
| Cure Min. 250° F. | 10 | 10 | 10 | 10 |
| Min. 350° F. | 10 | 10 | 10 | 10 |
| Rockwell E | 58 | 70 | 29 | 67 |
| Heat Distortion, °C. 264 psi | 58 | 82 | 71 | 125 |

Table II shows that the increase in the calcium silicate decisively increases the heat distortion. It also shows that addition of the Dienite produces an improvement of up to 43°C. in the heat distortion temperature.

TABLE III

MC-417 ALKYD/DIENITES

|  | Control | Run F | Run G | Run H | Run I | Run J | Run K |
|---|---|---|---|---|---|---|---|
| Alkyd Polyester | 100 | 85 | 85 | 85 | 85 | 85 | 85 |
| 0.3 DSV DIENITE homopolymer |  |  | 15 |  | 15 |  |  |
| 0.9 DSV DIENITE homopolymer |  | 15 |  | 15 |  | 15 |  |
| DIENITE Copolymer |  |  |  |  |  |  | 15 |
| Dicup 40 C |  | 5 | 5 | 5 | 5 | 5 | 5 |
| Wollastonite |  |  | 30 | 30 | 30 | 30 | 30 |
| Z-6075 Silane |  |  |  |  | 1 | 1 | 1 |
| Cure, 250°F. | 10' | 5' | 5' | 5' | 5' | 5' | 5' |
| 350°F. |  | 5' | 5' | 5' | 5' | 5' | 5' |
| Rockwell E | 65 | 66 | 65 | 70 | 67 | 73 | 53 |
| Flex Strength psi | 8300 | 8300 | 8600 | 10,600 | 8900 | 9200 | 9300 |
| Heat Distortion °C. 264 psi | 183 | 207 | 211 | 212 | 228 | 223 | 209 |

The following tables illustrate the improvements obtainable. In these tables, Wollastonite is a calcium silicate powder product by Cabot and Z-6075 is vinyltriacetoxysilane produced by Dow. Dicup 40 C is 40% dicumyl peroxide on calcium carbonate. Dicup R is 96-99% active dicumyl peroxide.

Table III shows the effect of the addition of calcium silicate and silane on the flex strength and other physical properties of the blends which themselves are varied. The silane improves the bonding of the resin to the Wollastonite and results in a further improvement in heat distortion. The Dienite consistently produced compositions with improved heat distortion temperatures.

I claim:

1. A cured blend of 50 to 95 parts by weight of a polyester of an unsaturated aliphatic acid and 50 to 5 parts of polybutadiene which is essentially a butadiene homopolymer or butadiene copolymer with 0 to 40 per cent of styrene, the molecular weight of the polybutadiene resin being 10,000 to 85,000, as determined by intrinsic viscosity, and at least 80 per cent by weight of its repeating diene units being of the 1,2-configuration, the heat distortion temperature and the adaptability to molding being increased by the presence of an effective amount, not over .200 parts by weight, of calcium silicate.

2. The blend of claim 1 which contains 85 to 60 parts of polyester and 15 to 40 parts of the butadiene homopolymer or copolymer.

3. The blend of claim 1 which contains a substantial amount of an aromatic vinyl monomer not in excess of 50% by weight.

4. The blend of claim 2 which contains 20 to 40 parts of vinyl monomer.

5. The blend of claim 1 which contains 10 to 200 parts of siliceous filler per 100 parts of the blend.

6. The blend of claim 5 which contains no more than 100 parts of filler.

7. The blend of claim 1 which is cured with a peroxide giving radicals of the structure $R_2(CH_3)CO\cdot$ in which R independently in each occurrence represents a hydrocarbon radical of 1 to 20 carbon atoms.

8. The blend of claim 1 which includes 0.5 to 2 parts of vinyl alkoxy silane for each part of the calcium silicate to improve the bonding of the calcium silicate to the blend, the alkoxy group containing 1 to 4 carbon atoms.

* * * * *